United States Patent [19]
Trest et al.

[11] Patent Number: 5,582,645
[45] Date of Patent: Dec. 10, 1996

[54] MAGNETIC DISPERSION COATING APPARATUS HAVING HIGH SHEAR REGIONS

[75] Inventors: Jeffrey A. Trest; Matthias H. Regelsberger, both of Rochester, N.Y.

[73] Assignee: Eastman Kodak Company, Rochester, N.Y.

[21] Appl. No.: 487,372

[22] Filed: Jun. 7, 1995

Related U.S. Application Data

[62] Division of Ser. No. 99,149, Jul. 29, 1993, Pat. No. 5,456,944, which is a continuation of Ser. No. 776,934, Oct. 15, 1991, abandoned.

[51] Int. Cl.$^6$ ........................................................ B05D 3/12
[52] U.S. Cl. ........................ 118/410; 118/411; 118/419; 427/128; 427/356
[58] Field of Search ............................ 118/410, 411, 118/419; 427/128, 356, 358

[56] References Cited

U.S. PATENT DOCUMENTS

| 2,644,195 | 7/1953 | Bennes et al. | 18/15 |
| 3,063,095 | 11/1962 | Limbach | 18/12 |
| 3,063,868 | 11/1962 | Brandsma et al. | 117/102 |
| 3,113,884 | 12/1963 | Kohler | 427/356 X |
| 3,129,460 | 4/1964 | Berger | 18/12 |
| 3,206,323 | 9/1965 | Miller et al. | 117/34 |
| 3,217,358 | 11/1965 | Kihara | 18/12 |
| 3,227,136 | 1/1966 | Bartlett et al. | 118/410 |
| 3,309,438 | 3/1967 | Bergstein et al. | 264/37 |
| 3,413,143 | 11/1968 | Cameron et al. | 117/120 |
| 3,461,837 | 8/1969 | Dreher | 118/50 |
| 3,479,989 | 11/1969 | Hunter et al. | 118/608 |
| 3,496,012 | 2/1970 | Biorseth | 117/111 |
| 3,526,528 | 9/1970 | Takahashi et al. | 117/34 |
| 3,584,600 | 6/1971 | Ishiwata et al. | 118/411 |
| 3,690,917 | 9/1972 | Hershoff et al. | 430/495 X |
| 3,711,312 | 1/1973 | Yoshida et al. | 117/34 |
| 3,755,523 | 8/1973 | Straub et al. | 264/90 |
| 3,817,208 | 6/1974 | Barnscheidt et al. | 118/119 |
| 3,869,304 | 3/1975 | Bogulslawski et al. | 117/652 |
| 4,145,173 | 3/1979 | Pelzer et al. | 425/224 |
| 4,245,582 | 1/1981 | Alheid et al. | 118/119 |
| 4,283,363 | 8/1981 | Boudenant et al. | 264/171 |
| 4,283,443 | 8/1981 | Choinski | 427/295 |
| 4,299,186 | 11/1981 | Pipkin et al. | 118/407 |
| 4,387,124 | 6/1983 | Pipkin | 427/356 |
| 4,411,614 | 10/1983 | Feathers | 425/466 |
| 4,424,762 | 1/1984 | Tanaka et al. | 118/410 |
| 4,469,782 | 9/1984 | Ishiwata et al. | 430/502 |
| 4,537,801 | 8/1985 | Takeda | 427/356 |
| 4,550,681 | 11/1985 | Zimmer et al. | 118/410 |
| 4,592,885 | 6/1986 | Ichino et al. | 264/171 |
| 4,623,501 | 11/1986 | Ishizaki | 264/171 |

(List continued on next page.)

FOREIGN PATENT DOCUMENTS

| 4038621 | 2/1992 | Japan . |
| 4129027 | 4/1992 | Japan . |

Primary Examiner—Jill Warden
Assistant Examiner—Harold Y. Pyon
Attorney, Agent, or Firm—Arthur H. Rosenstein; Mark G. Bocchetti

[57] ABSTRACT

An apparatus is disclosed for coating magnetic dispersion coatings on a continuously moving web substrate wherein regions of high shear are provided both before and after a magnetic dispersion application region. The coating apparatus comprises a die unit having a magnetic dispersion inlet and outlet, a concave lip extending arcuately from the outlet of the die unit, and a cylindrical backing roller adjacent the die unit, the die unit having an internal region of high shear, the concave lip and the cylindrical backing roller sharing a substantially common axis and forming a region of high shear in the form of a narrow gap. A coat hanger distribution chamber or cavity is also provided within the die unit between the magnetic dispersion inlet and the magnetic dispersion outlet. To even out pressure differences, a healing slot or cavity and/or a rotating bar within a cylindrical distribution chamber may be provided downstream of the coat hanger distribution chamber.

8 Claims, 14 Drawing Sheets

U.S. PATENT DOCUMENTS

| | | | |
|---|---|---|---|
| 4,667,879 | 5/1987 | Muller | 239/133 |
| 4,681,062 | 7/1987 | Shibata et al. | 118/410 |
| 4,822,640 | 4/1989 | Tuhkanen et al. | 427/211 |
| 4,828,779 | 5/1989 | Hiraki et al. | 264/171 |
| 4,836,134 | 6/1989 | Knop | 118/413 |
| 4,869,933 | 9/1989 | Sollinger et al. | 427/356 |
| 4,976,999 | 12/1990 | Ishizuka | 427/420 |
| 5,105,760 | 4/1992 | Takahashi et al. | 118/410 |
| 5,117,767 | 6/1992 | Sommer | 118/126 |
| 5,136,972 | 8/1992 | Naka et al. | 118/410 |
| 5,143,758 | 9/1992 | Devine | 427/420 |

FIG. 19
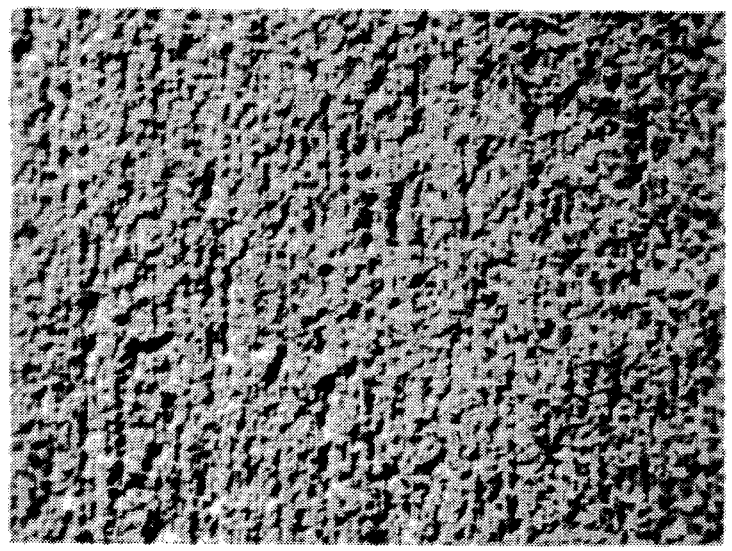
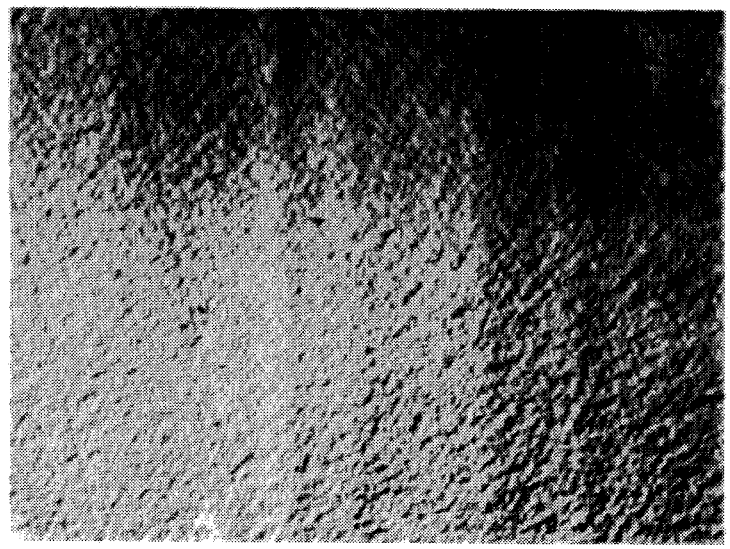
FIG. 20

FIG. 21
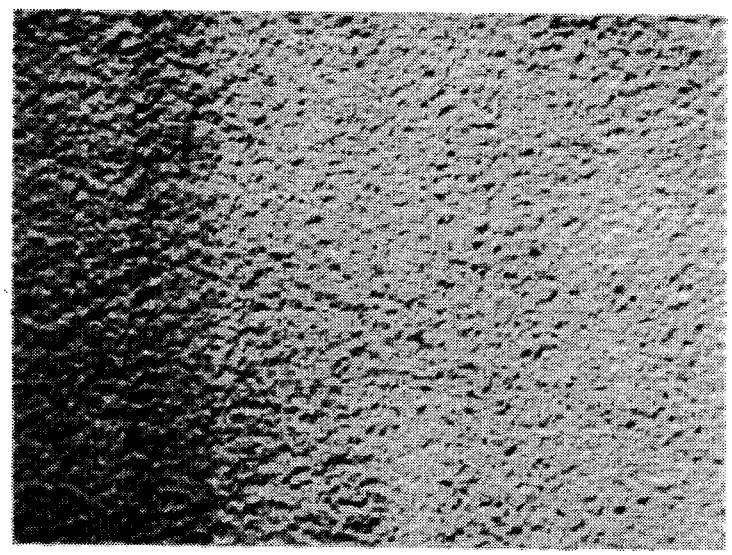
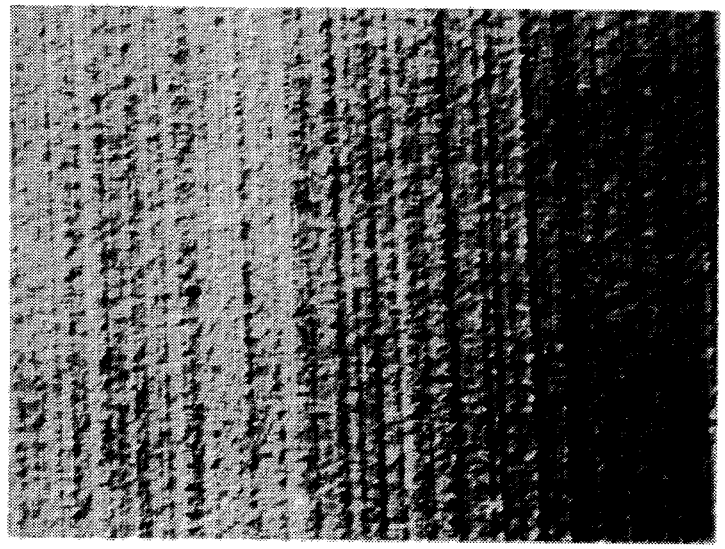
FIG. 22

FIG. 23
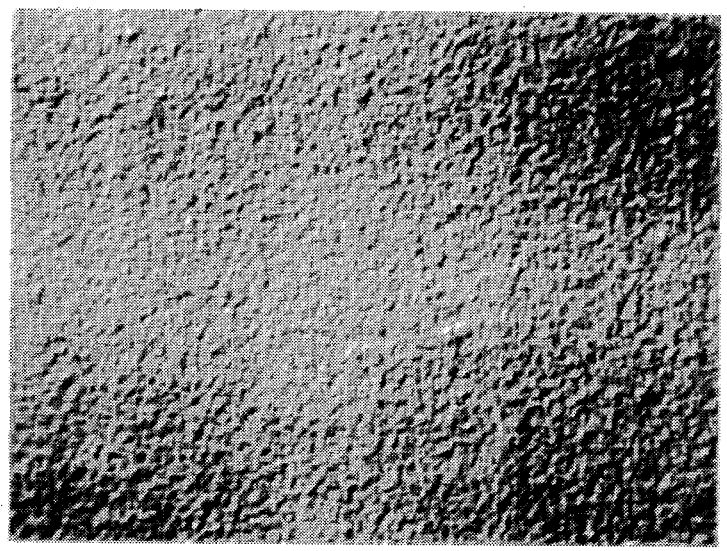
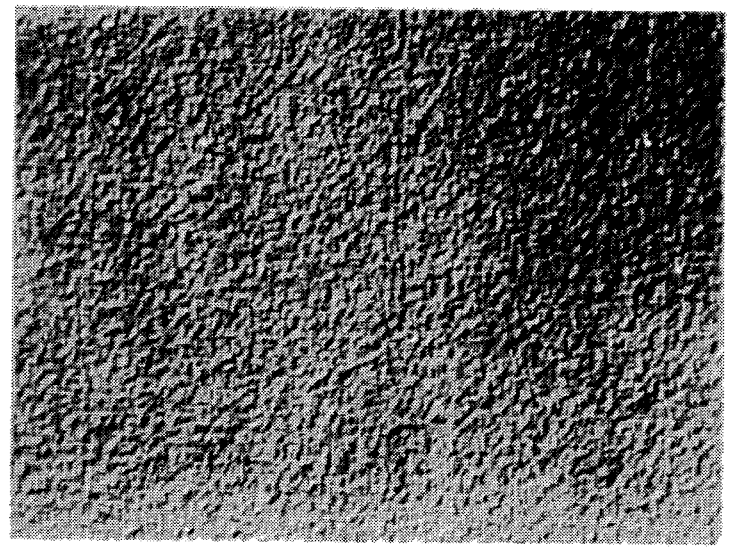
FIG. 24

FIG. 25
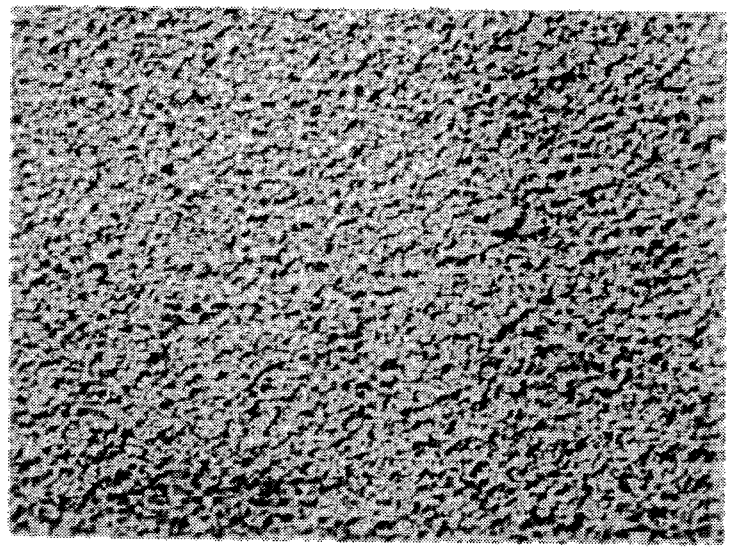
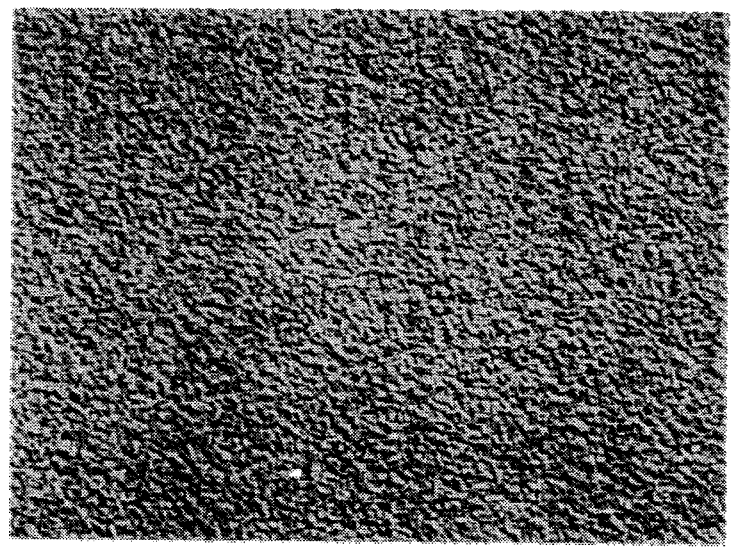
FIG. 26

FIG. 27
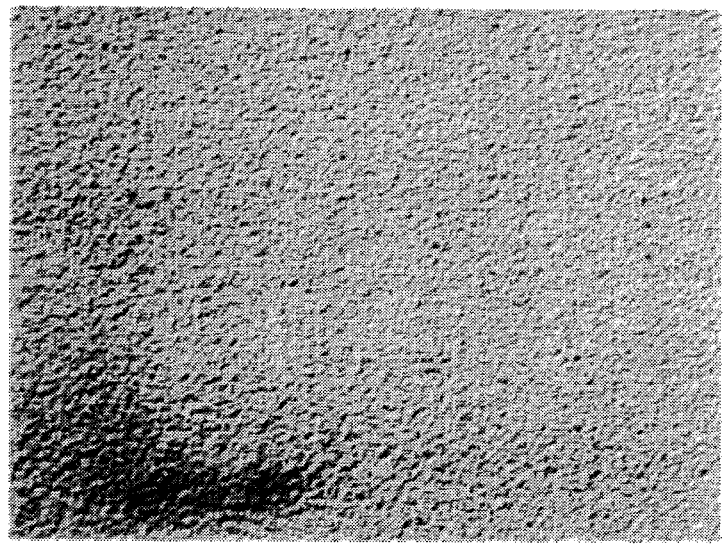
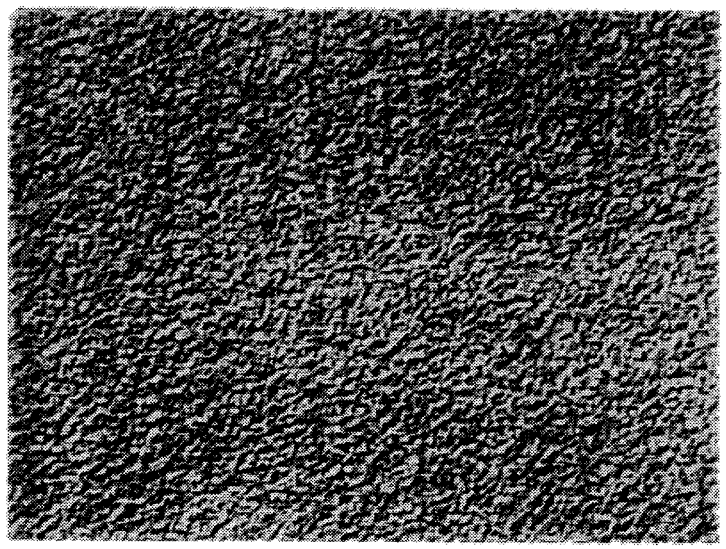
FIG. 28

MAGNETIC DISPERSION COATING APPARATUS HAVING HIGH SHEAR REGIONS

This is a Divisional of application Ser. No. 099,149, filed 29 Jul. 1993, now U.S. Pat. No. 5,456,944, which is a continuation of Ser. No. 776,934, filed 15 Oct. 1991, now abandoned.

BACKGROUND OF THE INVENTION

1. Field of the Invention

The present invention relates to a coating apparatus, and more particularly relates to a magnetic dispersion coating apparatus having high shear regions. Specifically, the present invention is directed to a coating apparatus wherein regions of high shear are provided both before and after a coating application point for applying magnetic dispersions on a continuously traveling flexible support material.

2. Description of Background Art

With the advent of computerized data processing equipment and digitized information, there also came a need and requirement for reliable storage media to store data in analog or digital form. Currently, there are a variety of different storage media available for storage of digitized information, e.g., magnetic tapes, magnetic flexible disks, magnetic hard disks, and optical storage media such as the so-called compact discs, etc.

Magnetic tapes and magnetic flexible disks enjoy widespread use due to their economy and availability. These media are manufactured by coating magnetic dispersions directly onto moving flexible supports. In the case of magnetic tapes, application of a coating of liquid magnetic dispersions is generally followed by an orientation of the magnetic particles, whereas in the case of magnetic disks, application of a coating of liquid magnetic dispersions is generally followed by disorientation of magnetic particles. The coating is then dried by convection or by electron beam curing and then calendered. Optional finishing steps include curing, burnishing, cleaning and/or sciving, depending on the parameters required or the particular intended use for the recording media.

Concurrent with the development of more powerful, computerized data processing equipment that handle both analog and digital data, there is a movement towards smaller and faster data storage devices having increased data storage capacities and increased data storage densities. For example, recently introduced digital data tape backup units are capable of storing enormous amounts of digitized data, e.g., 2 gigabytes, on magnetic tapes using, for example, 8 mm videocassettes. The most common way to effect the storage of such large amounts of data onto such small storage media is to increase the densities at which the data is recorded on the recording media.

The reliable storage and retrieval of information to and from data storage devices at any data transfer rate is critical in any data processing system. Thus, when high speed data transfer rate is combined with high density storage of data, the quality and integrity of the data storage media become all the more critical. Accordingly, the data storage media must meet certain levels of quality and performance parameters in order to satisfy and meet the requirements for safe, reliable and effective storage of data at high densities and at high data transfer rates while also allowing for effective retrieval of data under those same parameters.

With the movement towards smaller and faster data storage devices having increased data storage capacities and increased data storage densities, the physical size of each stored bit, the principal element of digitally stored information, necessarily becomes smaller as well. For magnetic recording media, the track-width of recorded magnetization becomes narrower and the wavelength of the recorded magnetization pattern becomes shorter. Thus, the uniformity of the magnetic properties of the magnetic coating must be at a level and at a scale sufficient to effectively and reliably record the magnetization pattern at the narrower track-widths and shorter wavelengths, i.e., the uniformity of the magnetic properties has to be measured at the same scale as the recorded magnetization. The surface quality, i.e., smoothness, of the magnetic recording media is also very critical to high performance media because the recording depth of the signals recorded onto the magnetic media is proportional to its wavelength. However, when the magnetic properties of magnetic recording media are measured on BH-loop tracers or vibrating sample magnetometers (VSM), the measurements reveal or characterize only bulk magnetic properties of the magnetic recording media as a whole and generally do not allow a determination or prediction of the reliability and performance of the recording media during actual use.

In any data storage/retrieval device that uses magnetic storage media, the signal-to-noise ratio is a critical performance parameter. Based on experimental and theoretical studies, it is known that the quality and operational characteristics of magnetic recording media, e.g., electronic noise of signal read-back from the storage media, are affected not only by the physical characteristics of the magnetic coating in terms of, for example, uniformity of thickness and uniformity of surface texture, but also by the magnetic character of the coating in terms of the uniformity of the magnetic properties of the coating, i.e., uniformity and quality of the magnetic dispersion. In general, the performance of the data storage/retrieval device is limited by the signal-to-noise ratio of the magnetic media itself. An increase in signal strength and/or a decrease in noise improves the signal-to-noise ratio of the magnetic media.

With the current trend in computer and data processing technology (including video and audio equipment) towards increased recording densities as well as increased power and complexity with the capabilities of processing increasing amounts of data over time coupled with the trend towards smaller size, there exists a need for storage media that satisfies the performance requirements for such equipment in terms of supporting the storage of data at higher densities as well as the transfer of data at higher data transfer rates during writing and reading operations.

A conventional coating die used in making magnetic recording media 10 is shown in FIG. 1 and generally comprises at least two die members 12, 14 opposedly and appropriately fastened against each other to define an extrusion passageway 16 through which magnetic dispersion is extruded out of extrusion opening 18 onto the surface of a moving flexible support 40. The dies are typically made from non-magnetic stainless steel although other materials such as non-magnetic metal alloys, ceramics and ceramic composites may be used. Although magnetic steels may be used in making the dies, such dies must be routinely demagnetized. At least one feed channel 19 is provided in at least one of the die members and extends through the body of the die to communicate with a magnetic dispersion source (not shown) and a distribution chamber 21. The extrusion passageway 16 extends from the distribution chamber 21 to an extrusion opening 18 through which the dispersion is applied on a moving support web 40. A severe drawback associated with this type of conventional coating device is the difficulty in controlling the shear rate of the magnetic dispersion traveling from the feed channel 19 to the distribution chamber 21 and through the extrusion passageway 16 before application on a moving support web 40. As a result, there is always a tendency for the magnetic dispersion to agglomerate as it passes from the feed channel 19 to the distribution chamber 21 and through the extrusion passageway 16 before exiting the extrusion outlet 18. Moreover, the magnetic dispersions that exit the extrusion outlet 18 may not be applied evenly and uniformly across the expanse of the coating layer. The net effect is that uniform coatings of magnetic dispersions in terms of both surface smoothness and magnetic properties are very difficult to attain.

As illustrated in FIG. 10, it is known to use a rotating bar 24 inside a cylindrical cavity 23 of a coating apparatus 10 to maintain high shear rates on magnetic dispersions. For example, U.S. Pat. No. 3,227,136 addresses the problems of uncontrollable shear rate and agglomeration by providing a cylindrical rotor, i.e., a rotating bar, in the cavity of an extrusion coating device to shear the magnetic dispersion prior to application on the moving web of support in order to maintain a relatively constant viscosity across the web. This prior art patent recognizes the importance of maintaining high shear rate conditions on magnetic dispersions as necessary to prevent agglomeration of the dispersed particles.

U.S. Pat. No. 3,479,989 identifies certain shortcomings of U.S. Pat. No. 3,227,136 as, inter alia, the presence of an "entrance defect", which appears under nearly all operating conditions as a line in the coated product corresponding in position to the entrance port through which the dispersion enters the chamber in the die body. Other identified shortcomings include limited flow capacity of the die and the high pressure drop in the dispersion in passing from the die entrance to the remote portions of the chamber. U.S. Pat. No. 3,479,989 addresses these shortcomings by providing a hollow, cylindrical distribution chamber formed within the body of a die, a metering slot terminating in an extrusion orifice and, extending along the length of the chamber and arcuately from the chamber, at least one slotted, or otherwise perforated, tubular rotor mounted within the chamber and having an outer diameter slightly less than the diameter of the chamber, and an inlet for directing a dispersion into an end of the rotor. A stationary shaft is mounted concentrically inside of the rotor to define an annular shear chamber with the inner surface of the rotor.

U.S. Pat. No. 4,828,779, also utilizes a rotating bar to maintain a uniform viscosity of the dispersion across the slot opening as it is applied on the moving flexible support web. In this patent, the coating solution or dispersion flows into an extruder through a solution- or dispersion-receiving inlet after which the coating solution or dispersion is sheared by rotor or rotating bar in an L-shaped region formed by the rotor and a pocket where there is a variance in viscosity, so that the viscosity of the coating solution is made substantially equal to the final viscosity of the coating solution in the pocket just before the coating solution reaches the end of the slit.

While the above-described prior art methods and apparatus are sufficient for producing magnetic storage media that satisfy the requirements and criteria for a relatively low density storage media, they are not capable of providing a magnetic dispersion coating of sufficient uniformity in terms of uniformity of magnetic characteristics and smoothness of surface finish to satisfy the requirements and criteria for a relatively high density storage media. Furthermore, the above-described prior art methods do not provide any means of shearing the dispersion after the application point. For example, the signal-to-noise ratio of magnetic storage media made using these prior art methods and apparatus is well below the level required for applications involving high density storage.

Doctoring blades have been used in coating apparatus for the purpose of metering the amount of coating solution being applied to a moving support before the coating solution is applied onto the support. For example, U.S. Pat. No. 4,424,762 describes a doctor edge made of cemented carbide. The doctor edge has a doctor surface bent towards the support so that the doctor edge is triangular in section, and the doctor edge is set close to the support in such a manner that the support is bent substantially triangular, therefore metering the amount of coating solution applied.

U.S. Pat. No. 3,584,600 discloses a multiple doctor blade coating apparatus for preparing photographic layers of photographic coating compositions wherein the final doctor blade has a surface dimension that is at least five times that of the preceding doctor blade and is used to meter the final, top coating composition. By use of this multiple doctor blade coating apparatus, it is possible to reduce the total thickness of the multiple layer coating by about 30 percent at spacings comparable to prior art.

U.S. Pat. No. 3,526,528 also discloses a coating apparatus having multiple doctoring blades for the purpose of coating a plurality of photographic emulsion layers on a traveling support, wherein each doctor blade is placed equidistant from the surface of the traveling web.

In U.S. Pat. No. 3,063,868, an air doctor knife is used to meter the amount of coating composition being applied to continuous webs. The leading edge of a shoe can also be used to mechanically doctor the layer with or without the smoothing action of the air doctor knife.

In all of the above-described prior art, the doctoring blade is used to meter the coating composition onto the support. The doctoring blades do not provide increased shear and are not intended to do so, since any increased shear would destroy the desired integrity of individual photographic layers. The use of doctor blades or edges also generates bead lines or streaks on the surface of the magnetic coating layer. Additionally, the buildup of excess magnetic coating composition in front of the doctoring blade requires removal in order to avoid solid or sticky buildup on the doctoring blade. Moreover, the creation of such excess magnetic coating composition is, in the first instance, a waste of the coating composition and, secondly, a cleanup problem. In the case of an air doctor knife, it is not possible to adapt such a knife for use an magnetic coating compositions because an air doctor knife would result in a flash drying of the coating composition, and such a result would create a magnetic film coating whose surface reflects the imperfections at the time of the flash drying while also generating an excess of coating material that must be collected and disposed of properly.

Accordingly, there has been a need for an apparatus for producing magnetic recording media that satisfies and meets the aforementioned needs, requirements and criteria without the shortcomings and disadvantages of the prior art in a safe and cost-effective manner. More specifically, the present invention is directed to a coating apparatus having a concave lip extending arcuately for applying magnetic dispersions on a continuously traveling flexible support material. The concave lip of the present invention is not a doctoring blade and is distinguished thereover because the concave lip is not used to meter the coating composition and, instead, is used to shear the coating composition as it is applied onto the support material.

A need has therefore existed for a coating apparatus that evenly and uniformly coats a coating media onto a continuously traveling flexible material. There has also been a need to provide a coating apparatus to apply an even and uniform magnetic dispersion coating on a flexible substrate to produce particulate magnetic media with superior dispersion qualities. There has still been another need to provide a coating apparatus that permits the even and uniform application of uniform magnetic dispersions on a flexible substrate under high shear conditions.

There has also been a need to provide a coating apparatus to apply onto a moving flexible substrate a magnetic dispersion coating layer having uniform magnetic characteristics over the entirety of the coating layer and having a uniform, smooth surface finish. Still another need has been to provide a coating apparatus to apply a magnetic coating composition onto a moving substrate web without generating any excess waste coating composition during the application of the coating composition.

There has also been a need to provide a new and useful method of applying a magnetic dispersion coating onto a moving substrate web. Moreover, there has been a need to provide a new and useful method of making magnetic recording media.

SUMMARY OF THE INVENTION

These needs and others have been satisfied by the coating apparatus of the present invention comprising a die unit having a magnetic dispersion outlet, a concave lip extending arcuately from the magnetic dispersion outlet of the die unit, and a cylindrical backing roller rotatably mounted adjacent the dispersion outlet of the die unit for supporting a continuously moving substrate, wherein the die unit has an internal region of high shear, formed between the arcuate form of the concave lip and the cylindrical form of the cylindrical backing roller both members sharing a common axis. A radial gap is defined as a narrow spacing formed between the concave lip of the die and the surface of the cylindrical backing roller. Since the concave lip and the cylindrical backing roller are mounted coaxially, the radial gap is characterized by the difference in radii of the backing roller and the concave lip. The radius of the concave lip is machined so that the desired coating gap is obtained. The coating gap corresponds to the radial gap reduced by the thickness of the flexible support.

These needs have also been satisfied by another embodiment of the present coating apparatus for coating a liquid dispersion of magnetic particulate media onto a continuously moving substrate, comprising a die unit having two die sections opposedly fastened together and defining a narrow planar gap, a known coat hanger-shaped distribution chamber, a known healing chamber, and a dispersion outlet; a backing roller rotatably mounted adjacent the dispersion outlet for supporting a continuously moving substrate; and a concave lip extending arcuately from the dispersion outlet of the die unit along one die section in close conformity with and at a uniform distance from the backing roller and, thus, forming a radial gap.

Yet these needs and others have further been satisfied by another embodiment of the present invention wherein the coating apparatus comprises a die unit having two die sections opposedly fastened together and defining a narrow planar gap, a coat hanger-shaped distribution chamber, a cylindrical cavity having a rotating bar rotatably mounted therein, and a dispersion outlet; a backing roller rotatably mounted adjacent the dispersion outlet for supporting a continuously moving substrate; and a concave lip extending arcuately from the dispersion outlet of the die unit along one die section in close conformity with and at a uniform distance from the backing roller and, thus, forming a radial gap.

These needs and others have also been satisfied by the present invention of a method of applying a magnetic dispersion coating on a moving substrate web comprising the steps of introducing the magnetic dispersion under pressure to a coat hanger-shaped distribution cavity of a coating die unit; conveying the magnetic dispersion at a constant pressure from the coat hanger-shaped distribution cavity to a high shear region defined by a narrow, planar gap extending across and within the coating die unit; conveying the magnetic dispersion at a constant pressure through an outlet extending across the coating die unit onto a moving substrate web supported by a backing roller; and introducing the magnetic dispersion on the substrate web to an extended high shear region defined as a radial gap between the backing roller and a concave lip extending arcuately from the outlet of the coating die unit.

These needs have further been satisfied by the additional provision of a method of applying a magnetic dispersion coating on a moving substrate web comprising the steps of introducing the magnetic dispersion under pressure to a coat hanger-shaped distribution cavity of a coating die unit and uniformly introducing the magnetic dispersion to a healing cavity within the coating die unit; conveying the magnetic dispersion at a constant pressure from the healing cavity to a high shear region defined by a narrow, planar gap extending across and within the coating die unit; conveying the magnetic dispersion at a constant pressure through an outlet extending across the coating die unit onto a moving substrate web supported by a backing roller; and introducing the magnetic dispersion on the substrate web to an extended high shear region defined as a radial gap between the backing roller and a concave lip extending arcuately from the outlet of the coating die unit.

These needs and others have further been satisfied by another embodiment of the present invention that provides a method of applying a magnetic dispersion coating on a moving substrate web comprising the steps of introducing the magnetic dispersion under pressure to a coat hanger-shaped distribution cavity within a coating die unit to uniformly introduce the magnetic dispersion at a constant pressure across the coating die unit to a cylindrical distribution cavity within the coating die unit; imparting high shear on the magnetic dispersion by action of a rotating bar rotatably mounted within the cylindrical distribution cavity; conveying the magnetic dispersion from the cylindrical distribution cavity to a high shear region defined by a narrow, planar gap extending across and within the coating die unit; conveying the magnetic dispersion at a constant pressure through a dispersion outlet extending across the coating die unit onto a moving substrate web supported by a backing roller; and introducing the magnetic dispersion on the substrate web to a high shear region defined as a radial gap between the backing roller and a concave lip extending arcuately from the outlet of the coating die unit.

BRIEF DESCRIPTION OF THE DRAWINGS

FIG. 19 is a photomicrograph of a magnetic coating made using a conventional, pre-metered extrusion slot die shown in FIG. 1 in accordance with Example 1.

FIG. 20 is a photomicrograph of a magnetic coating made using a conventional, extrusion die with a rotating bar shown in FIG. 10 in accordance with Example 1, wherein the rotating bar is rotated in a counterclockwise (ccw) direction.

FIG. 21 is a photomicrograph of a magnetic coating made using a conventional, extrusion die with a rotating bar shown in FIG. 10 in accordance with Example 1, wherein the rotating bar is rotated in a clock-wise (cw) direction.

FIG. 22 is a photomicrograph of a magnetic coating made using an extrusion die with a concave lip shown in FIGS. 2 and 3 in accordance with Example 2.

FIG. 23 is a photomicrograph of a magnetic coating made using an extrusion die with a rotating bar and a concave lip shown in FIGS. 11 and 12 in accordance with Example 3, with the rotating bar spinning at 1300 RPM.

FIG. 24 is a photomicrograph of a magnetic coating made using an extrusion die with a concave lip and a rotating bar shown in FIGS. 11 and 12 in accordance with Example 3, with the rotating bar spinning at 3314 RPM.

FIG. 25 is a photomicrograph of a magnetic coating made using a conventional, pre-metered extrusion slot die shown in FIG. 1 in accordance with Example 4.

FIG. 26 is a photomicrograph of a magnetic coating made using an extrusion die with a concave lip shown in FIGS. 2 and 3 in accordance with Example 4.

FIG. 27 is a photomicrograph of a magnetic coating made using a concave lip die with a rotating bar shown in FIGS. 11 and 12 in accordance with Example 5.

FIG. 28 is a photomicrograph of a magnetic coating made using a concave lip die shown in FIGS. 2 and 3 having a 1 inch length in accordance with Example 6.

DESCRIPTION OF THE PREFERRED EMBODIMENTS

Figure 1:
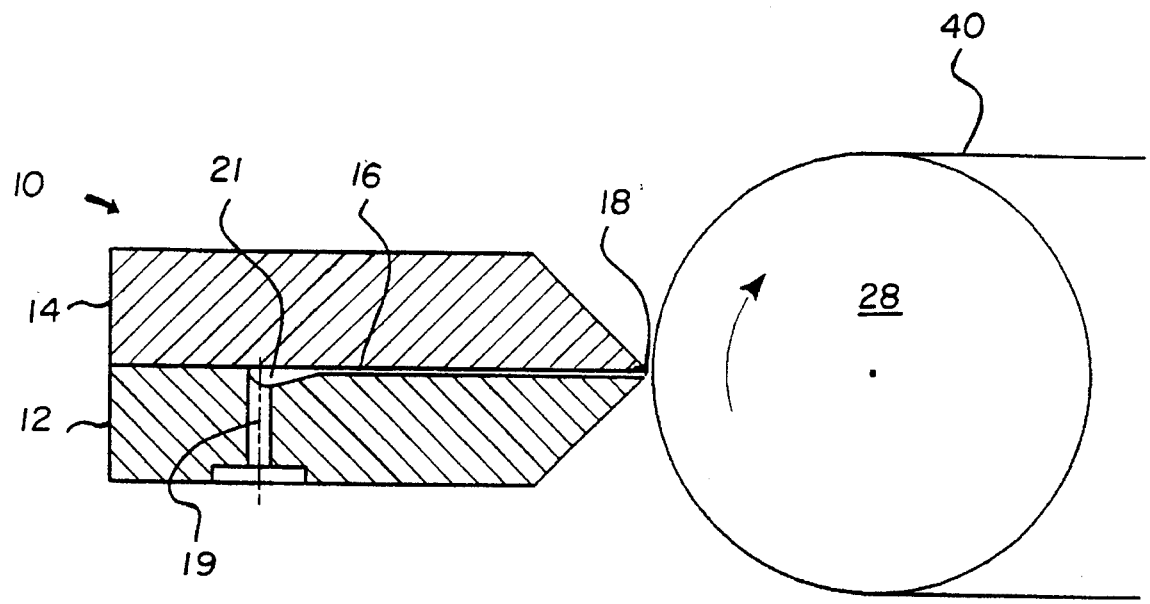
FIG. 1 is a diagrammatic view of a conventional, premetered extrusion slot die.

Reference will now be made in detail to preferred embodiments of the invention, examples of which are illustrated in the accompanying drawings. Wherever possible, the same reference numbers will be used throughout the drawings to refer to the same or like parts.

Referring now to FIGS. 2–9, it may be seen that a preferred embodiment of the apparatus of the present invention comprises a die unit 10 having two die sections 12, 14 in opposed relationship and fastened together using appropriate fastening means such as nuts and bolts. Each die section 12, 14 contains one half of a known coat hanger-shaped distribution cavity 21 that is used to supply a healing cavity 22 at a constant pressure across the coating die unit. The known coat hanger-shaped distribution cavity 21 functions as a distribution manifold where the cross section is varied from the center to the edge to obtain the desired distribution uniformity across the width of the coating die unit. In other words, the cross-sectional area of the distribution manifold 21 narrows from the center to the edges, and this narrowing allows the pressure drop or flow resistance to be nearly equal across the width of the die feeding the healing cavity 22.

A known healing cavity 22 is provided downstream of the coat hanger-shaped distribution cavity 21 to ensure that remaining pressure non-uniformities are healed out across the width of the coating die unit as the magnetic dispersion passes therethrough. The manifold 21 distributes the dispersion from a round feed tube 19, and the flow of the magnetic dispersion is directed to the center of the die where it is then spread by means of the coat hanger-shaped distribution cavity 21 before distribution through the slot to the healing cavity 22.

The exact design of the coat hanger distribution cavity 21 is a function of the rheology of the dispersion and therefore each rheology requires a specific coat hanger design. Computer modeling of specific configurations of coat hanger cavities is currently the most cost-efficient approach to designing for specific rheologies. As previously described, the two die sections 12, 14 define a coat hanger-shaped distribution cavity 21 and healing cavity 22 that are connected by a planar extrusion passageway 16 to an extrusion opening 18.

In the operation of the above-described coating apparatus, a magnetic dispersion is supplied from a stirred holding vessel (not shown) to a positive displacement pump (not shown) that pumps the dispersion via a conduit (not shown)

to the coat hanger-shaped distribution cavity 21. A planar gap 16 on the order of approximately 0.003 inches in height connects the coat hanger-shaped distribution cavity 21 to the healing cavity 22. A narrow, planar gap 16 on the order of approximately 0.003 inches in height imparts a high shear to the dispersion as it passes therethrough. The planar gap 16 is, as noted previously, formed by and between the two die sections 12 and 14.

The dispersion exits through dispersion outlet 18 that runs the width of the die and is deposited onto a moving, flexible support web 40 supported and fed by a backing roller 28. The backing roller 28 preferably has a surface finish on the order of between approximately 6–12 microinches. An integral concave die lip 26 extends arcuately from media outlet 18 and constitutes and behaves as a continuum of one surface of top die section 14. The backing roller 28 constitutes and behaves as a continuum of another surface of the second die section 12. Together, the concave die lip 26 and backing roller 28 define a narrow, radial gap 30 that effects a continuum of the high shear region of the narrow, planar gap 16 as an extended high shear region 30. More precisely, the dimension of the high shear region 30 is that of the coating gap formed between the concave lip and the surface of the web supported by the backing roller 28. The extended high shear region 30 imparts continuous high shear on the magnetic dispersion exiting the dispersion outlet 18. Accordingly, the width of the narrow radial gap 30 representing the distance between the concave lip 26 and the backing roller 28 is generally along the same order as the height of the narrow, planar gap 16 between die sections 12 and 14. Shear in the coating gap may be increased by narrowing the radial gap 30. The shear rate in the coating gap is also dependent on coating speed. For example, with a coating gap of 1.4 mils and coating speeds of 50 fpm to 500 fpm, the shear rate varies between 7,143 and 71,429 $sec^{-1}$. For a coating gap of 1.8 mils and coating speeds of 50 to 500 fpm, the shear rate varies between 5,556 and 55,555 $sec^{-1}$.

The height of the narrow, planar gap 16 is generally less than about 0.01 inches and is desirably about 0.003 inches and is preferably between about 0.001 to 0.002 inches (between about 1 to 2 mils). Accordingly, the width of the narrow radial gap 30 is generally less than about 0.01 inches and is desirably about 0.003 inches and is preferably between about 0.001 to 0.002 inches (between about 1 to 2 mils).

The concave lip 26 must extend over an arcuate distance or length sufficient to form the extended high shear region 30. The sufficiency of the distance or length over which the concave lip 26 extends is determined largely by the rheology of the magnetic dispersion media selected. With magnetic dispersion media having higher viscosities, the concave lip 26 must extend over greater arcuate distances or lengths. In general, however, a concave lip 26 having an arcuate length of between approximately 0.5 to 3 inches, and desirably between about 0.75 to 2 inches, and preferably 1 inch, is sufficient.

The surface finish of the concave lip 26 is also critical to the performance of the concave lip in the extended high shear region 30. Fine surface finishing of the concave lip 26 is achieved by use of tools such as diamond cutters. A concave lip 26 surface finish up to 20 microinches is tolerable, and in a preferred embodiment of the present invention, the surface finish is 8 microinches or less. By using precision diamond cutting tools, it is possible to obtain a surface finish approximating 2 microinches and even less, e.g., 0.5 to 1.5 microinches.

Referring now to FIGS. 11–18, it may be seen that another preferred embodiment of the present invention comprises a die unit 10 having two die sections 12, 14 in opposed relationship and fastened together using appropriate fastening means such as nuts and bolts. Each die section 12, 14 contains one half of a coat hanger-shaped cavity 21 that is used to supply the cylindrical split cavity 23 containing the rotating bar 24. The coat hanger-shaped cavity 21 functions as a distribution manifold wherein the cross section is varied from the center to the edge to obtain distribution uniformity across the width of the die. In other words, the cross-sectional area of the distribution manifold 21 narrows from the center to the edges. This allows the pressure drop or flow resistance to be nearly equal across the width of the die in relation to the distribution area feeding the cylindrical cavity 23. A healing slot (not shown) may be provided downstream of the coat hanger-shaped cavity 21 to ensure that the pressure is uniformly healed out across the width of the die as the magnetic dispersion passes therethrough to the cylindrical cavity 23. Accordingly, the resistance to flow will be identical across the die despite the difference in flow line length between the center and edges of the entrance to the cylindrical split cavity 23. The manifold 21 distributes the dispersion from a round feed tube 19, and the flow is directed to the center of the die where it is then spread by means of the coat hanger-shaped cavity 21 before distribution through the optional healing slot (not shown) to the cylindrical cavity 23.

As stated previously, the exact design of the coat hanger cavity 21 is a function of the rheology of the dispersion and therefore each rheology requires a specific coat hanger design. Computer modeling of specific configurations of coat hanger cavities is currently the most cost-efficient approach to designing for specific rheologies.

As previously described, the two die sections 12, 14 define a cylindrical cavity 23 that is connected by a planar extrusion passageway 16 to an extrusion opening 18. The height of the planar extrusion passageway 16, as previously noted, is generally less than about 0.01 inches and is preferably about 0.003 inches.

The rotating bar 24 is mounted within the cylindrical cavity 23 between an internal oilless bearing on one end and a mechanical sealing device on the other end where a shaft of the rotating bar 24 protrudes to operatively engage with an appropriate driving device such as a motor (not shown). The surface of both the rotating bar 24 and the cylindrical cavity 22 are highly polished, i.e., polished to approximately 20 microinches or less, preferably approximately 8 microinches or less.

The clearance between the surface of the rotating bar 24 and the cylindrical cavity 23 is a direct factor on the shear rate that is applied to the magnetic dispersion. Accordingly, the clearance is generally less than about 0.010 inches depending on the desired shear rate of the magnetic dispersion during operation with the rotation of the rotating bar 24.

The shear rate is also dependent upon the rotational velocity of the rotating bar 24. For example, with a rotating bar having a diameter of 0.78 inches with a clearance distance of 0.0065 inches between the surface of the rotating bar 24 and the surface of the cylindrical cavity 23 a shear rate in the range between 6,283 $sec^{-1}$ to 43,982 $sec^{-1}$ was realized when the rotating bar was rotated at a rotational velocity between 500 to 3500 RPM. As another example, with a clearance distance of 0.015 inches, a shear rate in the range between 2,723 $sec^{-1}$ to 19,059 $sec^{-1}$ was realized when the rotating bar was rotated at a rotational velocity between 500 to 3500 RPM. As still another example, with a rotating bar having a diameter of 0.78 inches with a clearance distance of 0.060 inches, a shear rate in the range between 680 sec$^{-1}$ to 4,765 sec$^{-1}$ was realized when the rotating bar was rotated at a rotational velocity between 500 to 3500 RPM. In the scope of the present invention, the general range of rotational velocity of the rotating bar for a given clearance distance is to achieve shear rates higher than about 20,000 sec$^{-1}$.

In the operation of the coating apparatus of the present embodiment, a magnetic dispersion is supplied from a stirred holding vessel (not shown) to a positive displacement pump (not shown)-that pumps the dispersion via a conduit 19 to the coat hanger cavity 21. A planar gap or slit 16 on the order of approximately 0.002 inches in height connects the manifold 21 to the cylindrical cavity 23. The range of rotational velocity of the rotating bar 24 is preferably selected to impart shear on the magnetic dispersion at about 20,000 sec$^{-1}$ or higher. The rotational action of the rotating bar 24 imparts a high shear to the dispersion as it passes through the cylindrical cavity 23 and through another narrow, planar gap 16 on the order of approximately 0.003 inches in height. The rotational action of the rotating bar 24 performs a function similar to that of the healing cavity described above in conjunction with another embodiment of the present invention. The planar gap 16 is, as noted previously, formed by and between the two die sections 12 and 14.

The dispersion exits through dispersion outlet 18 that runs the width of the die and is deposited onto a moving, flexible support web 40 supported and fed by a backing roller 28. The backing roller 28 has a surface finish of less than about 20 microinches and preferably less than 8 microinches. A concave lip 26 constitutes and behaves as a continuum of a surface of one die section 14. The backing roller 28 constitutes and behaves as a continuum of another surface of the second die section 12. Together, the concave lip and backing roller define a narrow, radial gap or slit that represents a continuum of the high shear region of the narrow, planar gap 16 as an extended high shear region 30. As stated previously, the precise dimension of the high shear region is given by the dimension of the coating gap. The extended high shear region 30 imparts continuous high shear on the magnetic dispersion exiting the dispersion outlet 18. Accordingly, the gap distance between the concave lip and the backing roller is along the same order as the height of the narrow, planar gap.

The concave lip 26 must extend over an arcuate distance or length sufficient to form the extended high shear region 30. As noted previously, the sufficiency of the arcuate distance or length over which the concave lip 26 extends is determined largely by the rheology of the magnetic dispersion media selected. With magnetic dispersion media having higher viscosities, the concave lip 26 must extend over greater arcuate distances or lengths. In general, however, a concave lip 26 having an arcuate length of approximately 1 inch is sufficient.

As noted before, the surface finish of the concave lip 26 is also critical to the performance of the concave lip in the extended high shear region 30. Fine surface finishing of the concave lip 26 is achieved by use of tools such as diamond cutters. A concave lip 26 surface finish up to 20 microinches is tolerable, and in a preferred embodiment of the present invention, the surface finish is 8 microinches or less.

The inventors of the present invention have discovered that due to the visco-elastic nature of the magnetic dispersion, the shear rate must be maintained up to the point of application on the flexible support web 40. This maintenance of shear rate is accomplished by providing a concave lip 26 having an arcuate form that conforms closely with the circumference of the backing roller 28 over which the flexible substrate web 40 is conveyed. In addition, a coat hanger distribution cavity 21 ahead of the healing cavity 22 and/or a cylindrical cavity 23 having a rotating bar 42 may be used to control uniformity and to equalize pressure distribution of the magnetic dispersion up to the application point 18. An evenly distributed magnetic dispersion is thus supplied under uniform pressure to a region of high shear in the narrow, planar gap or slit 16, and the high shear is maintained by the concave lip at the application region 30 of the magnetic dispersion onto the moving web support 40. The high shear region provided before the application point 18 by means of the rotating bar 24 and after the application point by means of the concave lip 26 ensures that agglomeration of magnetic particles is substantially avoided during the application process.

The advantages and features of the present invention will be further shown by way of the following examples which are intended to be purely exemplary.

EXAMPLE 1

Figure 10:
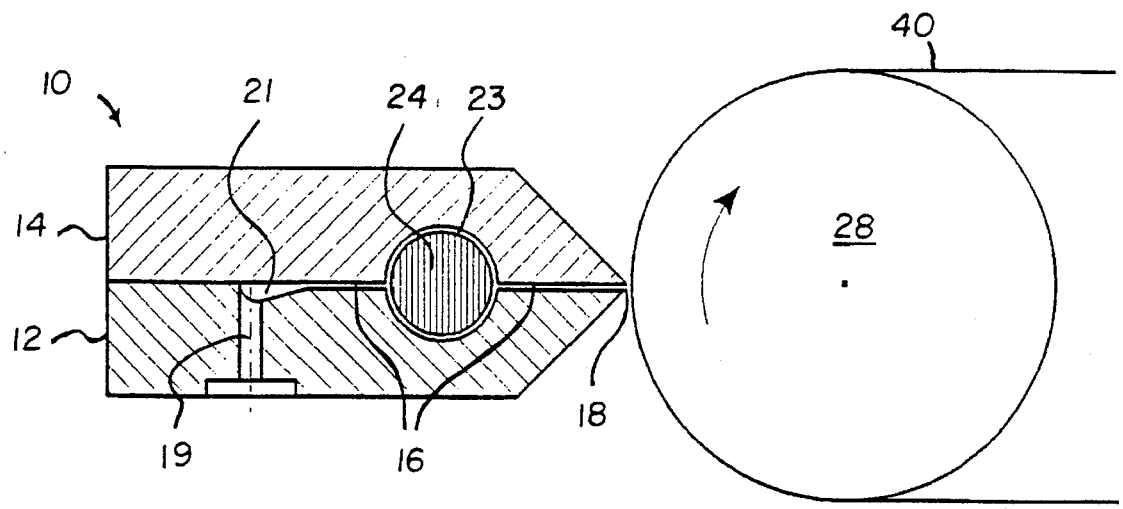
FIG. 10 is a diagrammatic view of an extrusion die with a rotating bar.

The performance of a conventional, pre-metered slot extrusion die as shown in FIG. 1 was compared with the performance of a pre-metered slot extrusion die having a rotating bar as shown in FIG. 10. A magnetic dispersion of the following composition was used:

| CONSTITUENTS | AMOUNT |
|---|---|
| Cobalt Doped Magnetic Iron Oxide | 100 parts |
| Polyurethane Resin | 16 parts |
| Phenoxy Resin | 6 parts |
| Myristic Acid | 1 part |
| Octyl Palmitate | 1 part |
| Carbon Black | 4 parts |
| Aluminum Oxide | 5 parts |
| Soya Lecithin | 3 parts |
| Cyclohexanone | 317 parts |

Two films were made with the pre-metered slot extrusion die having a rotating bar with a diameter of 0.78 inches with a clearance of 0.0065 inches: one film with the rotating bar rotated clockwise (cw) and one film with the rotating bar rotated counter-clockwise (ccw), at a rotational velocity of 3400 RPM.

The magnetic dispersion was applied to 57 gauge (0.57 mils) polyethylene terephthalate substrate at a coating speed of 100 ft/min and a coverage of 2.6 cc/sq. ft., resulting in a final dry coating thickness of 4.0 microns. The coating layer was dried in a conventional dryer and was then calendered at 200 degrees Fahrenheit at 1800 pli. Table 1 summarizes the data obtained from these coatings.

TABLE 1

|  | Conventional Die | Conventional Die with Rotary Bar Spinning (cw) | Conventional Die with Rotary Bar Spinning (ccw) |
|---|---|---|---|
| Surface Contact before/after calendering | 25/77 (%) | 43/83 (%) | 41/85 (%) |

TABLE 1-continued

|  | Conventional Die | Conventional Die with Rotary Bar Spinning (cw) | Conventional Die with Rotary Bar Spinning (ccw) |
|---|---|---|---|
| Gloss (20 degree) before/after calendering | −2/84 | −1/139 | −1/134 |
| Orientation Ratio $M_r(x)/M_r(y)$ | 1.58 | 1.64 | 1.67 |
| Electrical Performance (relative to reference) | | | |
| 300 KHz SNR (HiDC) | −5.8 dB | −4.4 dB | −5.5 dB |
| 10 KHz SNR (HiDC) | −11.0 dB | −9.4 dB | −9.0 dB |
| Output Uniformity at 300 KHz | 1 ± dB | 1.8 ± dB | 1.4 ± dB |
| Amplitude Modulation | 20 (%) | 15 (%) | 13 (%) |
| Wyko Surface Roughness (cross-coating direction) | | | |
| RMS | 27 nm | 13.8 nm | 14.6 nm |
| Peak-to-Valley | 132 nm | 71 nm | 70 nm |

The above data shows that a die employing a rotating bar improves the surface quality of the magnetic coating as measured by "Surface Contact" and "Gloss". The measurements characterize the flatness and smoothness of the coatings. The sense of rotation, clockwise or counter-clockwise (cw/ccw), of the rotating bar is considered of minor importance based upon the experimental data above.

The above data also shows that a die employing a rotating bar produces a magnetic media having increased "Orientation Ratio". The ratio is derived from the remanent magnetization in coating direction, $M_r(x)$, over remanent magnetization measured in cross-coating direction, $M_r(y)$, after normalization with their respective saturation magnetizations ($M_s$) by dividing $M_r$ by $M_s$ for each direction. The higher shear generated by the rotating bar helps orient the magnetic particles in the coating direction which is the preferred alignment of magnetic particles for magnetic media in tape format.

Electrical performance is also enhanced by employment of the rotating bar as a direct consequence of the improved surface characteristics. The narrow slot (3.1 KHz) signal-to-noise ratio (SNR) at 300 KHz and 10 KHz both show that the use of a rotating bar results in a significant improvement over a conventional extrusion die without a rotating bar. The signal level for the SNR measurements was obtained by using a record current optimized at 0.6 micron recording wavelength representing twice the gap width of the recording head. The noise level was obtained after erasing the media with a current ten times the optimized write current at 300 KHz and is indicated by the designation "HiDC". The different wavelengths (300 KHz corresponding to 0.6 micron and 10 KHz corresponding to 19.8 micron) make the SNR at 300 KHz highly sensitive to noise generated by individual particles, whereas the long wavelength SNR is highly sensitive to surface imperfections on the scale of a few microns, e.g., 10 microns. The improvements at both 10 KHz and 300 KHz in terms of the SNR suggest that the particles are better dispersed causing less noise and higher signal at short wavelengths. The improved surface quality also reduces noise at long wavelengths.

Based upon the above data in Table 1, the improved surface quality obtained by the use of the rotating bar also improved the signal uniformity measured at 300 KHz. Moreover, the variation in peak read-back amplitude as measured in amplitude modulation (given as a percentage) was also improved as a result of the improved surface quality obtained by use of the rotating bar. The improved surface quality obtained by the use of the rotating bar is further evident by the Wyko Surface Roughness measurements where 13.8 nm and 14.6 nm root mean square (RMS) and 71 nm and 70 nm Peak-to-Valley measurements of the surface topology showed significant improvements over the conventional die coating with 27 nm RMS and 132 nm Peak-to-Valley.

FIGS. 20 and 21 are photomicrographs that illustrate the improved surface qualities of magnetic media obtained using a conventional, extrusion die with a rotating bar (FIG. 10) over a conventional magnetic media (FIG. 19) made using a conventional, extrusion die without the rotating bar (FIG. 1).

EXAMPLE 2

Figure 2:
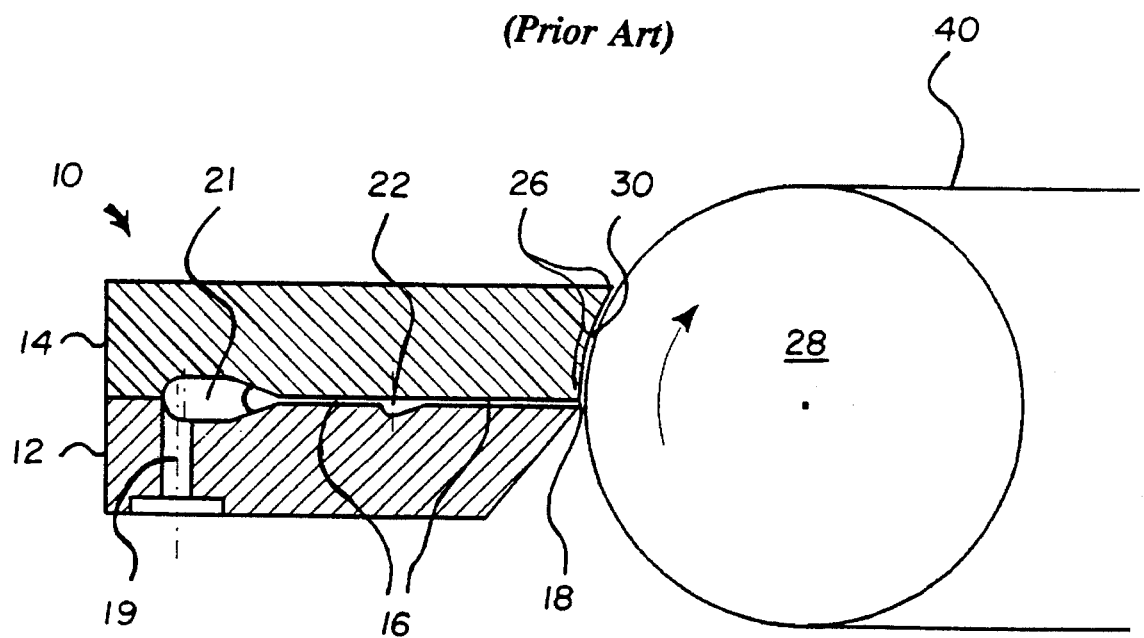
FIG. 2 is a diagrammatic view of an extrusion die with a concave lip, a coat hanger-shaped cavity and a healing cavity.
Figure 3:
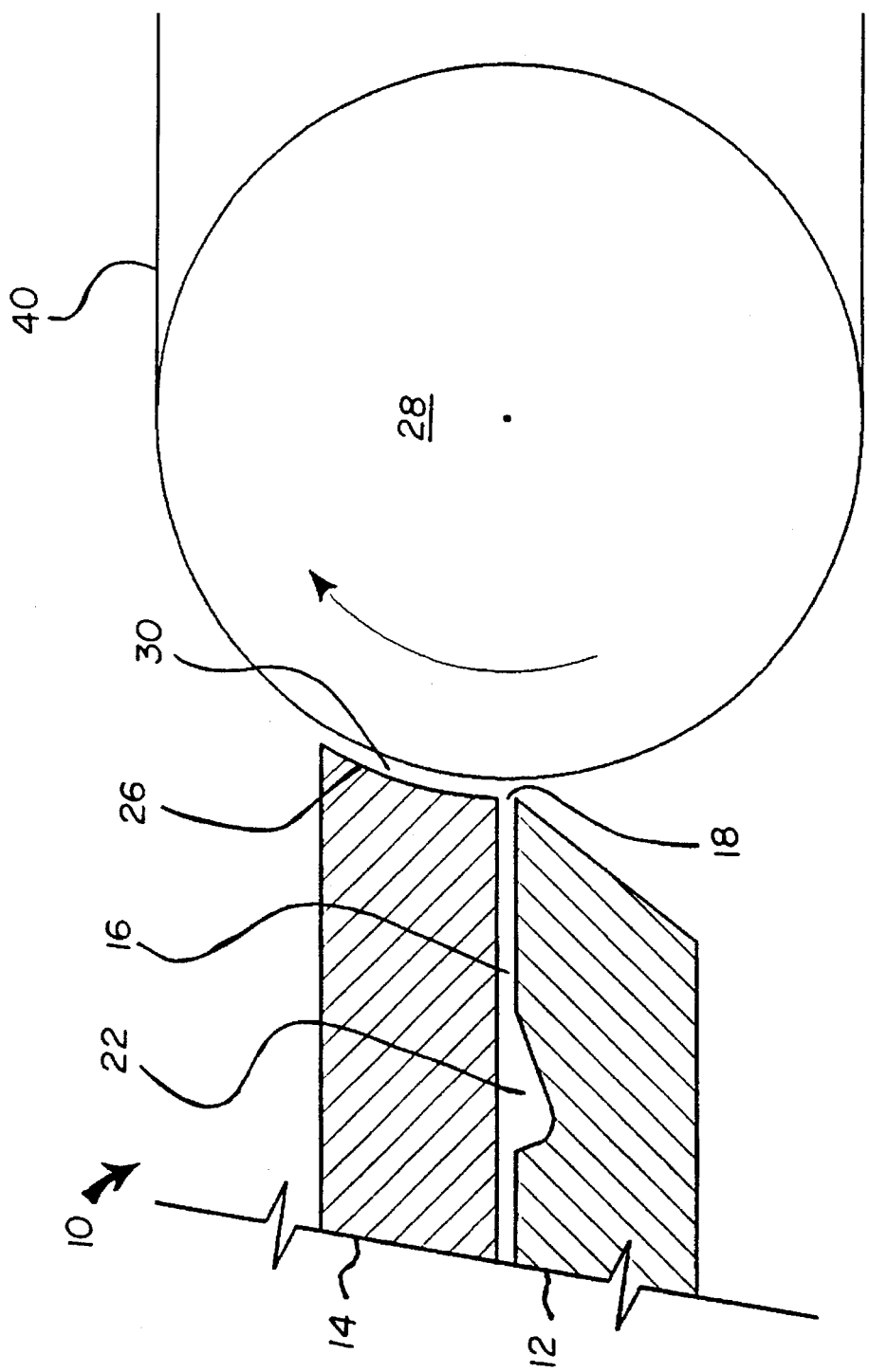
FIG. 3 is a partial, enlarged, diagrammatic view of the die with a concave lip shown in FIG. 2.
Figure 4:
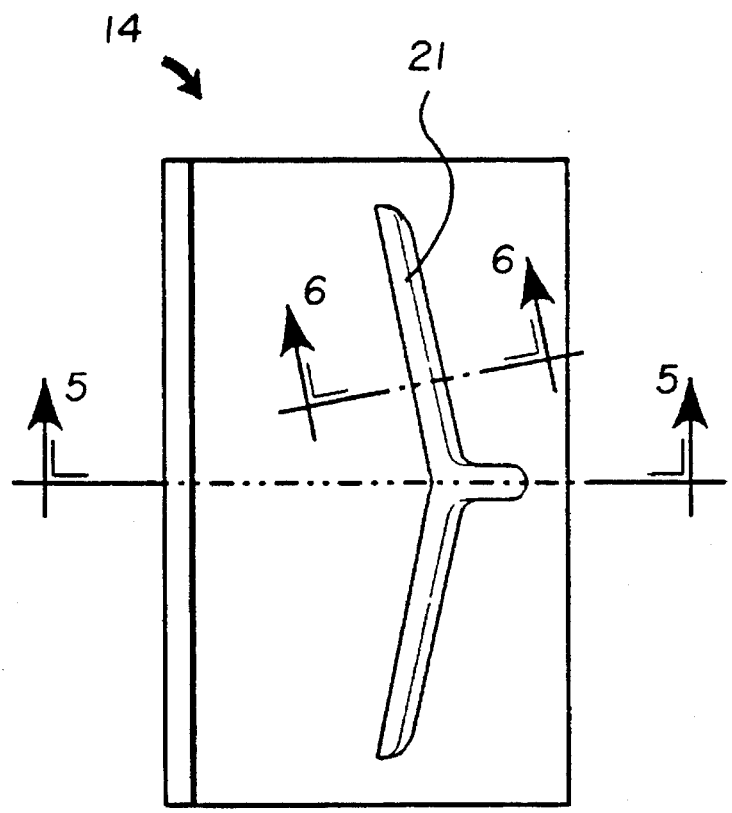
FIG. 4 is a partial, plan, diagrammatic view of a first die section indicated as reference number 14 in FIG. 2 showing the coat hanger-shaped distribution cavity.
Figure 5:
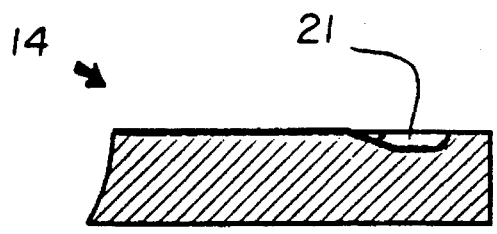
FIG. 5 is a partial, cross-sectional view of the first die section 14 taken along line 5 in FIG. 4.
Figure 6:
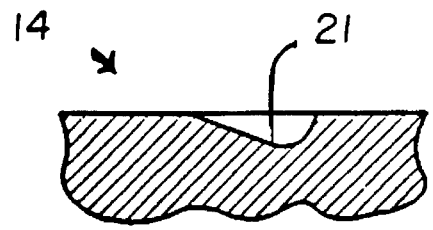
FIG. 6 is a partial, cross-sectional view of the first die section 14 taken along line 6 in FIG. 4.
Figure 7:
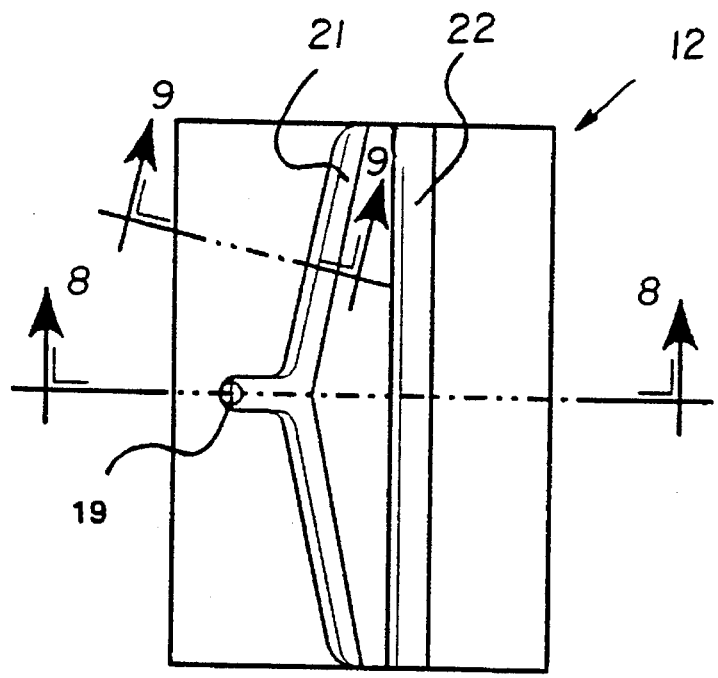
FIG. 7 is a partial, plan, diagrammatic view of a second die section indicated as reference number 12 in FIG. 2 showing the coat hanger-shaped cavity and the healing cavity.
Figure 8:
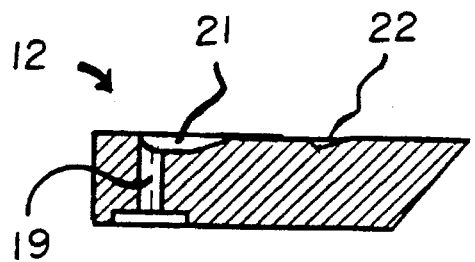
FIG. 8 is a partial, cross-sectional view of the second die section 12 taken along line 8 in FIG. 7.
Figure 9:
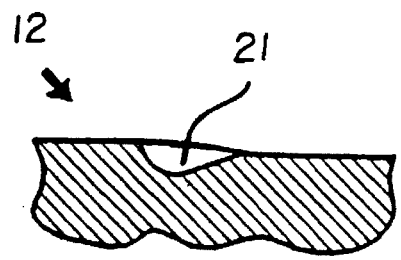
FIG. 9 is a partial, cross-sectional view of the second die section 12 taken along line 9 in FIG. 7.

The performance of a conventional, pre-metered slot extrusion die as shown in FIG. 1 was compared with the performance of a pre-metered slot extrusion die having a concave lip as shown in FIGS. 2 and 3. The composition of the magnetic dispersion was the same as used in Example 1. The magnetic dispersion was applied as a coating and calendered in the manner as described in Example 1. Table 2 summarizes the data obtained from these coatings.

TABLE 2

|  | Conventional Die | Concave Lip Die |
|---|---|---|
| Surface Contact before/after calendaring | 25/77 (%) | 60/90 (%) |
| Gloss (20 degree) before/after calendering | −2/84 | 1/162 |
| Orientation Ratio $M_r(x)/M_r(y)$ | 1.58 | 1.52 |
| Electrical Performance (relative to reference) | | |
| 300 KHz SNR (HiDC) | −5.8 dB | −1.9 dB |
| 10 KHz SNR (HiDC) | −11.0 dB | −4.8 dB |
| Output Uniformity at 300 KHz | 1 ± dB | 0.9 ± dB |
| Amplitude Modulation | 20 (%) | 5.9 (%) |
| Wyko Surface Roughness (cross-coating direction) | | |
| RMS | 27 nm | 8.3 nm |
| Peak-to-Valley | 132 nm | 40 nm |

The above data shows that a die employing a concave lip improves the surface quality of the magnetic coating as measured by "Surface Contact" and "Gloss". The measurements characterize the flatness and smoothness of the coatings. The above data also shows that a die employing a concave lip produces a magnetic media having increased "Orientation Ratio". The ratio is derived from the remanent magnetization in coating direction $M_r(x)$, over remanent magnetization measured in cross-coating direction, $M_r(y)$, after normalization with their respective saturation magnetizations ($M_s$) by dividing $M_r$ by $M_s$ for each direction. The extended high shear region formed between the concave lip and the backing roller improves the application of the magnetic dispersion onto he substrate resulting in increased magnetic uniformity of the coating and increased surface smoothness.

Electrical performance is also enhanced by employment of the rotating bar as a direct consequence of the improved surface characteristics. The narrow slot (3.1 KHz) signal-to-noise ratio (SNR) at 300 KHz and 10 KHz both show that the use of a rotating bar results in a significant improvement over a conventional extrusion die without a rotating bar. The signal level for the SNR measurements was obtained by using a record current optimized at 0.6 micron recording wavelength representing twice the gap width of the recording head. The noise level was obtained after erasing the media with a current ten times the optimized write current at 300 KHz and is indicated by the designation "HiDC". The different wavelengths (300 KHz corresponding to 0.6 micron and 10 KHz corresponding to 19.8 micron) make the SNR at 300 KHz highly sensitive to noise generated by individual particles, whereas the long wavelength SNR is highly sensitive to surface imperfections on the scale of a few microns, e.g., 10 microns. The improvements at both 10 KHz and 300 KHz in terms of the SNR suggest that the particles are better dispersed causing less noise and higher signal at short wavelengths. The improved surface quality also reduces noise at long wavelengths.

Based upon the above data in Table 2, the improved surface quality obtained by the use of the concave lip also improved the signal uniformity measured at 300 KHz. Moreover, the variation in peak read-back amplitude as measured in amplitude modulation (given as a percentage) was also improved as a result of the improved surface quality obtained by use of the concave lip die. The improved surface quality obtained by the use of the concave lip is further evident by the Wyko Surface Roughness measurements where 8.3 nm root mean square (RMS) and 40 nm Peak-to-Valley measurements of the surface topology showed significant improvements over the conventional die coating with 27 nm RMS and 132 nm Peak-to-Valley.

FIG. 22 is a photomicrograph that illustrates the improved surface qualities of magnetic media obtained using a die unit with a concave lip as shown in FIGS. 2 and 3 as compared with a conventional magnetic media (FIG. 19) made using a conventional, extrusion die without a concave lip as shown in FIG. 1.

EXAMPLE 3

Figure 11:
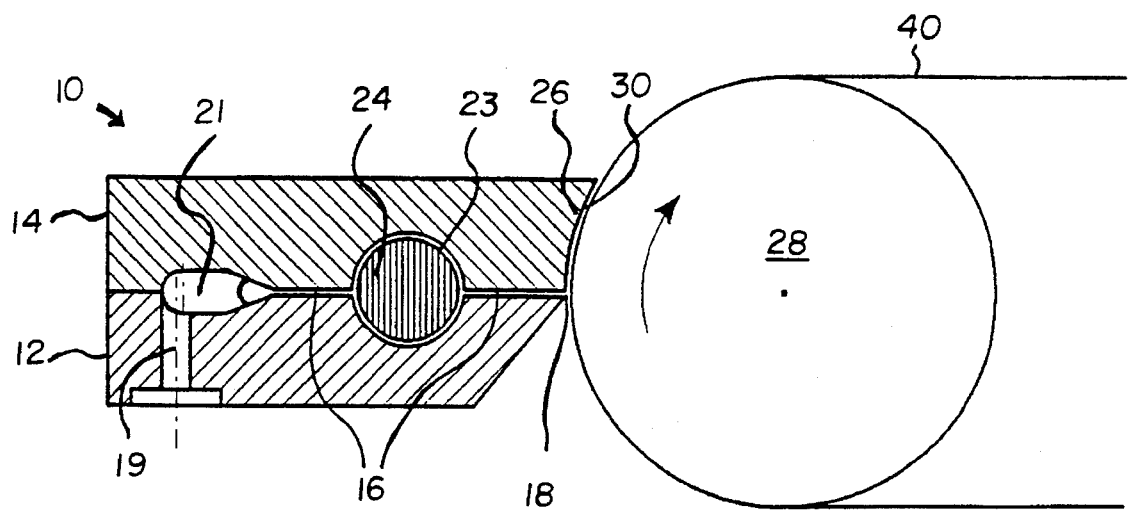
FIG. 11 is a diagrammatic view of an extrusion die having a rotating bar and a concave lip.
Figure 12:
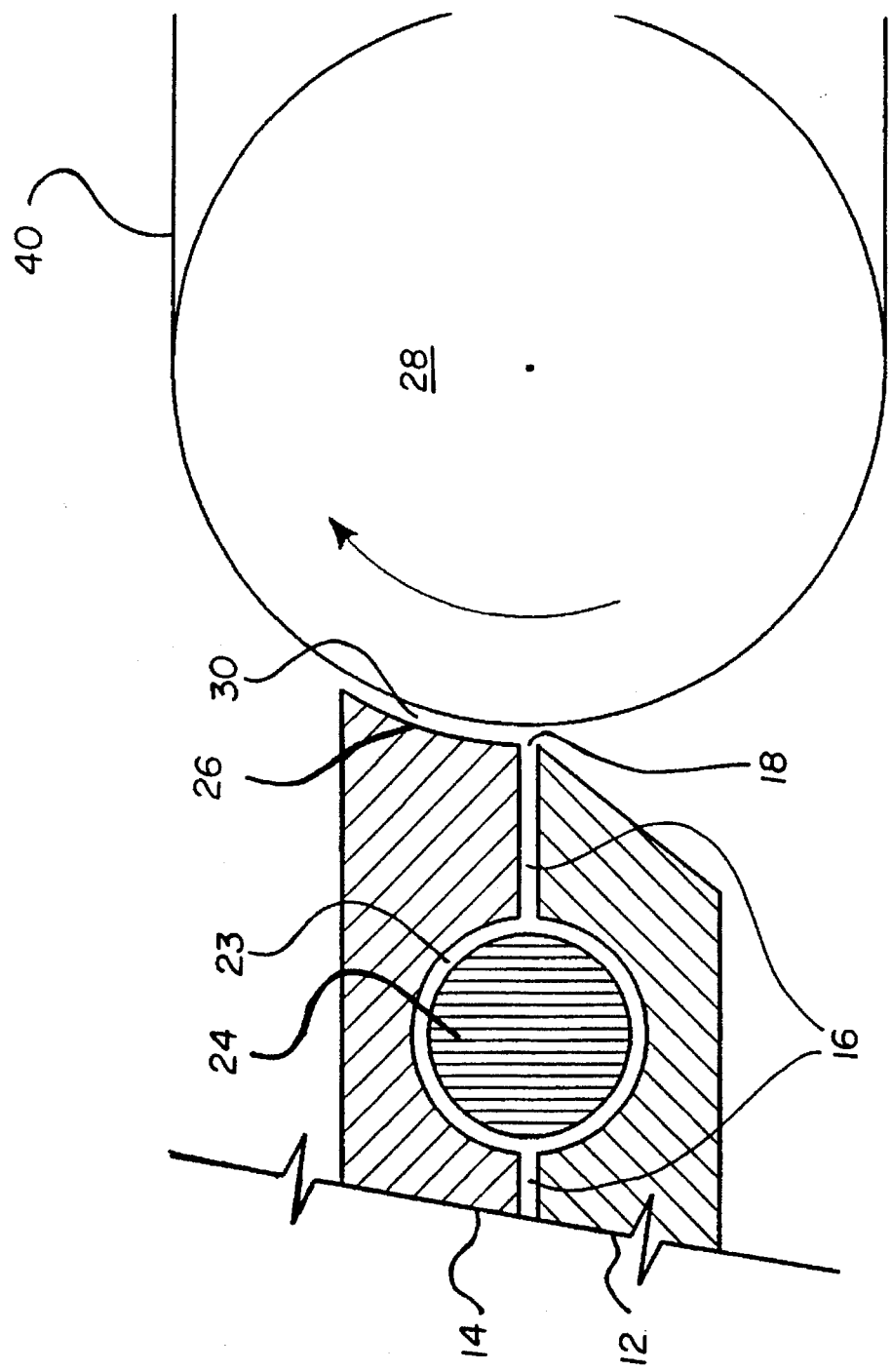
FIG. 12 is a partial, enlarged, diagrammatic view of the die having a rotating bar and a concave lip shown in FIG. 11.
Figure 13:
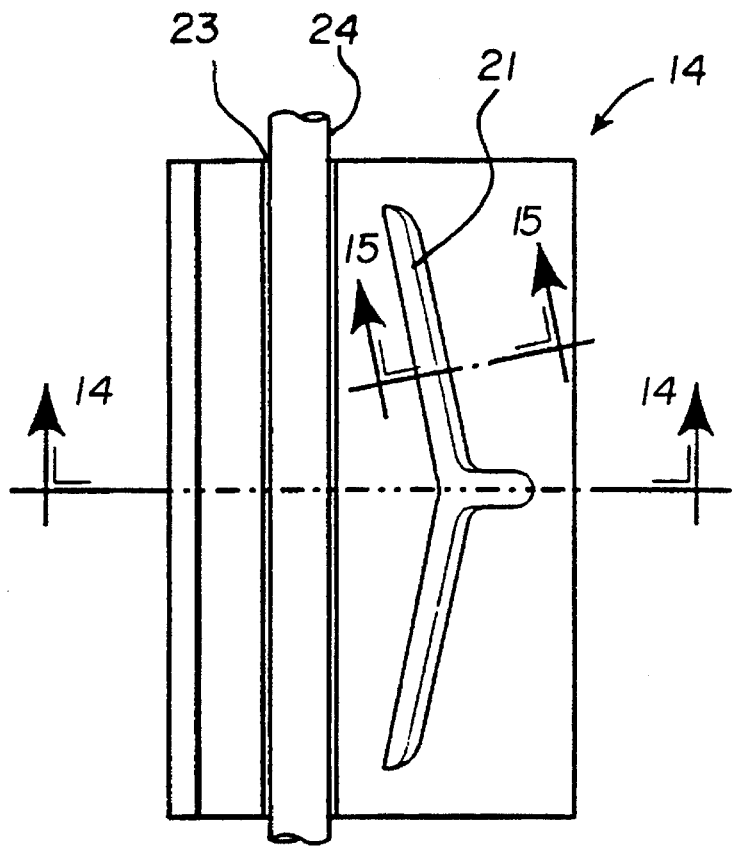
FIG. 13 is a partial, plan, diagrammatic view of a first die section indicated as reference number 14 in FIG. 11 showing a coat hanger-shaped distribution cavity and a rotating bar in a split cylindrical cavity.
Figure 14:
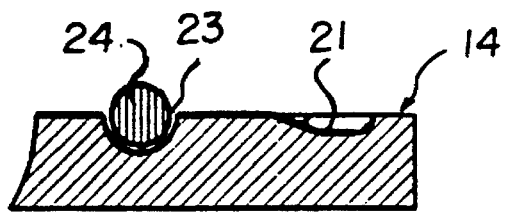
FIG. 14 is a partial, cross-sectional view of the first die section 14 taken along line 14 in FIG. 13.
Figure 15:
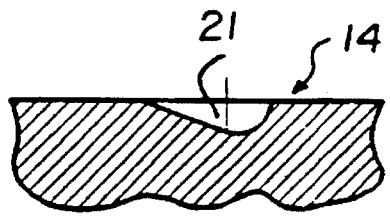
FIG. 15 is a partial, cross-sectional view of the first die section 14 taken along line 15 in FIG. 13.
Figure 16:
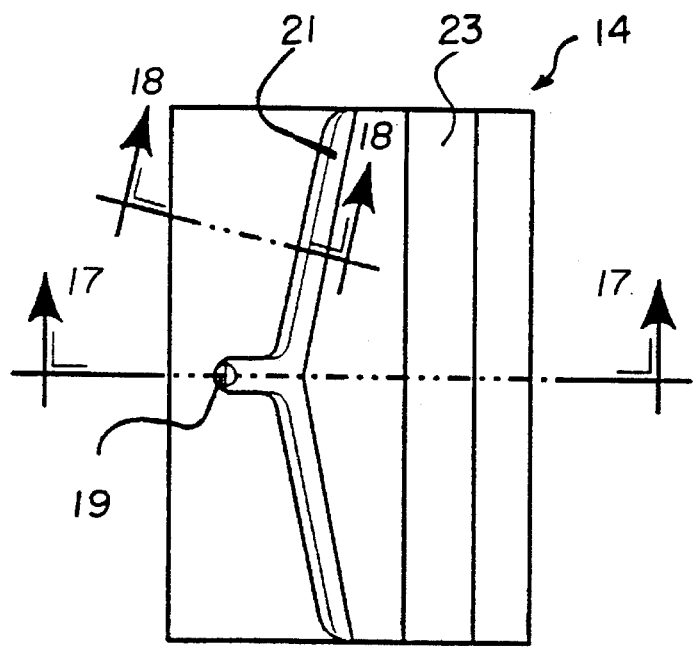
FIG. 16 is a partial plan, diagrammatic view of a second die section indicated as reference number 12 in FIG. 11 showing a coat hanger-shaped distribution cavity and a split cylindrical cavity for a rotating bar.
Figure 17:
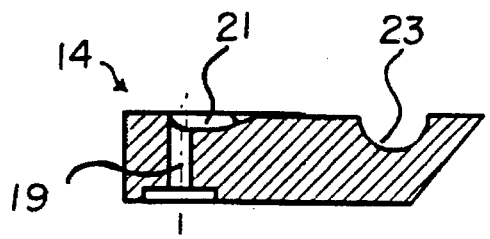
FIG. 17 is a partial, cross-sectional view of the second section 12 taken along line 17 in FIG. 16.
Figure 18:
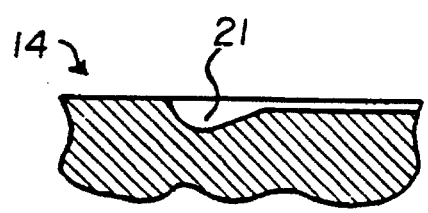
FIG. 18 is a partial, cross-sectional view of the second die section 12 taken along line 18 in FIG. 16.

The performance of a magnetic media tape made using a pre-metered slot extrusion die with a concave lip as shown in FIGS. 2 and 3 in accordance with Example 2 is compared with the performance of a magnetic media tape made using an extrusion die with a rotating bar and a concave lip as shown in FIGS. 11 and 12. A magnetic dispersion of the following composition was used:

| CONSTITUENTS | AMOUNT |
| --- | --- |
| Metal Particle | 100 parts |
| Aluminum Oxide | 5 parts |
| Carbon Black | 4 parts |
| Dispersant | 6 parts |
| Butyl Myristate | 2 parts |
| Myristic Acid | 1 part |

-continued

| CONSTITUENTS | AMOUNT |
| --- | --- |
| Abrasive Dispersant | 0.1 parts |
| Polyurethane Resin | 37 parts |
| Blocked Isocyanate | 3 parts |
| Tetrahydrofuran | 9 parts |
| Methyl Ethyl Ketone | 266 parts |
| Toluene | 26 parts |
| Cyclohexanone | 129 parts |

The magnetic dispersion was applied using the extrusion die with a rotating bar and a concave lip onto 57 gauge (0.57 mils) polyethylene terephthalate substrate at a coating speed of 100 ft/min and a coverage of 2.6 cc/sq. ft., resulting in a final dry coating thickness of 4.0 microns. Two separate coatings were made: one with the rotating bar rotating at 1300 RPM and one with the rotating bar rotating at 3314 RPM. The coating layers were dried in a convention dryer and were then calendered at 200 degrees Fahrenheit at 1800 pli. Table 3 summarizes the data obtained from these coatings.

TABLE 3

|  | Concave Lip Die | Concave Lip Die with Rotating Bar rotating at 1300 RPM (cw) | Concave lip Die with Rotating Bar Rotating at 3314 RPM (cw) |
| --- | --- | --- | --- |
| Surface Contact before/after calendering | (%) 54/90 | (%) —/91 | (%) 53/91 |
| Gloss (20 degree) before/after calendering | 26/224 | —/227 | 32/226 |
| Orientation Ratio $M_r(x)/M_r(y)$ | 1.36 | 1.31 | 1.37 |
| Wyko Surface Roughness (Cross-Coating direction) | | | |
| RMS | 11 nm | 9 mm | 9 nm |
| Peak-to-Valley | 89 nm | 55 mm | 69 mm |
| Ra | 8.2 nm | 6.7 mm | 7.0 nm |

The above data shows that magnetic tape media made using a concave lip die employing a rotating bar exhibits qualities and characteristics that are superior to magnetic tape media made using a concave lip die without a rotating bar. The improved surface quality obtained by the use of the rotating bar is further evident by the Wyko Surface Roughness measurements where 9 nm and 9 nm RMS, 55 nm and 69 nm Peak-to-Valley, and 6.7 nm and 7.0 nm Ra measurements showed significant improvements over the die coating with a concave lip die with 11 nm RMS, 89 nm Peak-to-Valley and 8.2 Ra values.

FIG. 25 is a photomicrograph illustrating the improved surface qualities of magnetic media made using a concave lip die having a rotating bar as shown in FIGS. 11 and 12 as compared with a magnetic tape media (FIG. 22) made using a concave lip die without a rotating bar as shown in FIGS. 2 and 3.

EXAMPLE 4

The performance of a conventional pre-metered slot extrusion die as shown in FIG. 1 was compared with the performance of a pre-metered slot extrusion die having a concave lip as shown in FIGS. 2 and 3. A magnetic dispersion of the following composition was used:

| Constituents | Amount |
| --- | --- |
| Cobalt Doped Iron Oxide | 100 parts |
| Aluminum Oxide | 8 parts |
| Carbon Black | 2 parts |
| Dispersant | 3 parts |
| Butyl Myristate | 1 part |
| Myristic Acid | 1 part |
| Vinyl Resin | 4.4 parts |
| Polyurethane | 15 parts |
| Isocyanate Cross-linker | 4.4 parts |
| Methyl Ethyl Ketone | 265 parts |
| Cyclohexanone | 146 parts |
| Toluene | 19 parts |
| Methyl Isobutyl Ketone | 0.6 parts |

The magnetic dispersion was applied to 57 gauge (0.57 mil) polyethylene terephthalate substrate at a coating speed of 100 ft/min and a coverage of 2.4 cc/sq. ft., resulting in a final dry coating thickness of 4.1 microns. The coating layer was dried in a conventional dryer and was then calendered at 180 degrees Fahrenheit at 2000 pli. Table 4 summarizes the data obtained from these coatings.

TABLE 4

|  | Conventional Die | Concave lip Die |
| --- | --- | --- |
| Surface Contact before/after calendering | 12/68 (%) | 26/81 (%) |
| Gloss (20 degree) before/after calendaring | −3/61 | −3/93 |
| Orientation Ratio $M_r(x)/M_r(y)$ | 1.03 | 1.13 |
| Electrical Performance (relative to reference) |  |  |
| 300 KHz SNR (HiDC) | −8.6 dB | −4.2 dB |
| 10 KHz SNR (HiDC) | −21.3 dB | −11.9 dB |
| Amplitude Modulation | 25 (%) | 15 (%) |
| Wyko Surface Roughness (cross-coating direction) |  |  |
| RMS | 69 nm | 26 mm |
| Peak-to-Valley | 412 nm | 183 nm |
| Ra | 55 nm | 21 nm |

The above data shows that a die employing a concave lip improves the surface quality of the magnetic coating as measured by "Surface Contact" and "Gloss". The measurements characterize the flatness and smoothness of the coatings. The above data also shows that a die employing a concave lip produces a magnetic media having increased "Orientation Ratio". The ratio is derived from the remanent magnetization in coating direction $M_r(x)$ over remanent magnetization measured in cross-coating direction $M_r(y)$, after normalization with their respective saturation magnetizations ($M_s$) by dividing $M_r$ by $M_s$ for each direction. The extended high shear region formed between the concave lip and the backing roller improves the application of the magnetic dispersion onto the substrate resulting in increased magnetic uniformity of the coating and increased surface smoothness.

Electrical performance is also enhanced by employment of the rotating bar as a direct consequence of the improved surface characteristics. The narrow slot (3.1 KHz) signal-to-noise ratio (SNR) at 300 KHz and 10 KHz both show that the use of a rotating bar results in a significant improvement over a conventional extrusion die without a rotating bar. The signal level for the SNR measurements was obtained by using a record current optimized at 0.6 micron recording wavelength representing twice the gap width of the recording head. The noise level was obtained after erasing the media with a current ten times the optimized write current at 300 KHz and is indicated by the designation "HiDC". The different wavelengths (300 KHz corresponding to 0.6 micron and 10 KHz corresponding to 19.8 micron) make the SNR at 300 KHz highly sensitive to noise generated by individual particles, whereas the long wavelength SNR is highly sensitive to surface imperfections on the scale of a few microns, e.g., 10 microns. The improvements at both 10 KHz and 300 KHz in terms of the SNR suggest that the particles are better dispersed causing less noise and higher signal at short wavelengths. The improved surface quality also reduces noise at long wavelengths.

Based upon the above data in Table 4, the improved surface quality obtained by the use of the concave lip also improved the signal uniformity measured at 300 KHz. Moreover, the variation in peak read-back amplitude as measured in amplitude modulation (given as a percentage) was also improved as a result of the improved surface quality obtained by use of the rotating bar. The improved surface quality obtained by the use of the rotating bar is further evident by the Wyko Surface Roughness measurements where 26 nm RMS, 183 nm Peak-to-Valley, and 21 nm Ra measurements showed significant improvements over the die coating with a concave lip die with 69 nm RMS, 412 nm Peak-to-Valley and 55 nm Ra values.

FIG. 26 is a photomicrograph that illustrates the improved surface qualities of magnetic media obtained using a die unit with a concave lip as shown in FIGS. 2 and 3 as compared with a conventional magnetic media (FIG. 25) made using a conventional, extrusion die without a concave lip as shown in FIG. 1.

EXAMPLE 5

The performance of a pre-metered slot extrusion die having a concave lip as shown in FIGS. 2 and 3 was compared with the performance of a pre-metered slot extrusion die having a rotating bar and a concave lip as shown in FIGS. 11 and 12. The rotating bar had a diameter of 0.78 inches with a clearance of about 0.0065 inches and was rotated at a rotational velocity of 3500 RPM. The composition of the magnetic dispersion was the same as used in Example 4. The magnetic dispersion was applied as a coating and calendered in the manner as described in Example 4. Table 5 summarizes the data obtained from these coatings.

TABLE 5

|  | Concave Lip Die | Concave Lip Die w/Rotating Bar |
| --- | --- | --- |
| Surface Contact before/after calendering | 26/81 (%) | 31/84 (%) |
| Gloss (20 degrees) before/after calendaring | −3/93 | −3/125 |
| Orientation Ratio (Mr-x/Mr-y) | 1.13 | 1.18 |
| Electrical |  |  |

TABLE 5-continued

|  | Concave Lip Die | Concave Lip Die w/Rotating Bar |
|---|---|---|
| Performance (relative to reference) | | |
| 300 KHz SNR (HiDC) | −4.2 dB | −2.1 dB |
| 10 KHz SNR (HiDC) | −11.9 dB | −10.1 dB |
| Amplitude Modulation | 15 (%) | 11 (%) |
| Wyko Surface Roughness (cross-coating direction) | | |
| RMS | 26 nm | 20 nm |
| Peak-to-Valley | 183 nm | 126 nm |
| Ra | 21 nm | 16 nm |

The above data shows that a concave lip die with a rotating bar is superior to the concave lip without the rotating bar. A concave lip die employing a rotating bar exhibits improved surface quality of the magnetic coating as measured by "Surface Contact" and "Gloss" over a concave lip die without the rotating bar. The measurements characterize the flatness and smoothness of the coatings. The above data also shows that a concave lip die employing a rotating bar produces a magnetic media having increased "Orientation Ratio" over a concave lip die without the concave lip. The high shear imparted on the magnetic dispersion by the action of the rotating bar inside the cylindrical cavity before application on the substrate web in conjunction with the extended high shear region formed between the concave lip and the backing roller improves the application of the magnetic dispersion onto the substrate resulting in increased magnetic uniformity of the coating and increased surface smoothness.

Electrical performance is also enhanced by employment of the rotating bar in conjunction with the concave lip as a direct consequence of the improved surface characteristics. The narrow slot (3.1 KHz) signal-to-noise ratio (SNR) at 300 KHz and 10 KHz both show that the use of a rotating bar results in a significant improvement over an extrusion die having a concave lip but without a rotating bar. The signal level for the SNR measurements was obtained by using a record current optimized at 0.6 micron recording wavelength representing twice the gap width of the recording head. The noise level was obtained after erasing the media with a current ten times the optimized write current at 300 KHz and is indicated by the designation "HiDC". The different wavelengths (300 KHz corresponding to 0.6 micron and 10 KHz corresponding to 19.8 micron) make the SNR at 300 KHz highly sensitive to noise generated by individual particles, whereas the long wavelength SNR is highly sensitive to surface imperfections on the scale of a few microns, e.g., 10 microns. The improvements at both 10 KHz and 300 KHz in terms of the SNR suggest that the particles are better dispersed causing less noise and higher signal at short wavelengths. The improved surface quality also reduces noise at long wavelengths.

The variation in peak read-back amplitude as measured in amplitude modulation (given as a percentage) was also improved as a result of the improved surface quality obtained by use of the rotating bar. The improved surface quality obtained by the use of the rotating bar and concave lip is further evident by the Wyko Surface Roughness measurements where 20 nm (RMS) and 126 nm Peak-to-Valley and 16 nm Ra values showed significant improvement over the coating die unit with the concave lip with 26 nm (RMS) and 183 nm Peak-to Valley and 21 nm Ra values.

FIG. 27 is a photomicrograph that illustrates the improved surface qualities of magnetic media obtained using a die unit with both a concave lip and a rotating bar as shown in FIGS. 11 and 12 as compared with a magnetic media (FIG. 26) made using an extrusion die having a concave lip but without a rotating bar as shown in FIGS. 2 and 3.

Comparing the photomicrograph of the coating as shown in FIG. 27 with the photomicrographs of the coatings as shown in FIG. 23 and 24, it is apparent that the surface shown in FIG. 27 has a different grain characteristic than the surfaces shown in FIGS. 23 and 24. This is due to the fact that the coating surface shown in FIG. 27 was made using a magnetic dispersion having different magnetic particles and different chemical composition than the magnetic dispersion used in making the coating surfaces shown in FIGS. 23, 24. However, in each instance, the benefits of using both a rotating bar and a concave lip are apparent.

EXAMPLE 6

The performance of pre-metered slot extrusion dies having concave lips of different arcuate length and without rotating bars were compared. The composition of the magnetic dispersion was the same as used in Example 4. The magnetic dispersion was applied as a coating and calendered in the manner as described in Example 4. Table 6 summarizes the data obtained from these coatings.

TABLE 6

|  | Concave Lip Die (1 inch lip) | Concave Lip Die (⅝ inch lip) |
|---|---|---|
| Surface Contact before/after calendering | 26/81 (%) | 19/78 (%) |
| Gloss (20 degrees) before/after calendaring | −3/93 | −3/96 |
| Orientation Ratio (Mr-x/Mr-y) | 1.13 | 1.09 |
| Electrical Performance (relative to reference) | | |
| 300 KHz SNR (HiDC) | −4.2 dB | −4.5 dB |
| 10 KHz SNR (HiDC) | −11.9 dB | −14.1 dB |
| Amplitude Modulation | 15 (%) | 15 (%) |
| Wyko Surface Roughness (cross-coating direction) | | |
| RMS | 26 nm | 35 nm |
| Peak-to-Valley | 183 nm | 202 nm |
| Ra | 21 nm | 28 nm |

Figure 29:
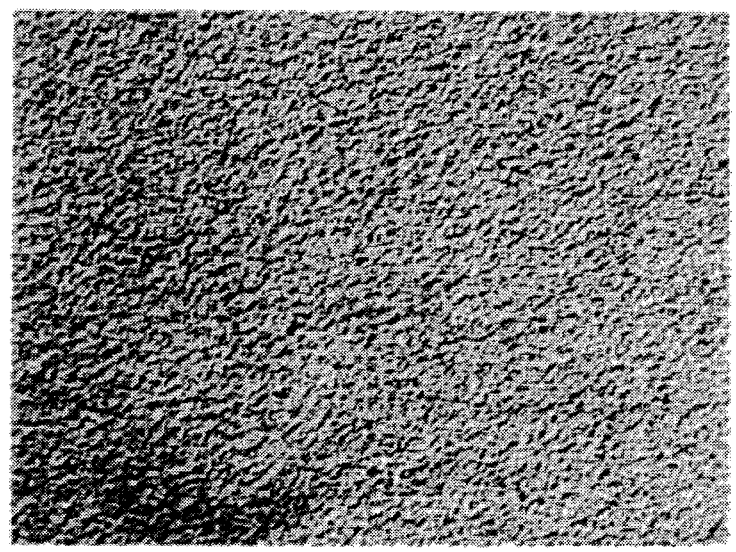
FIG. 29 is a photomicrograph of a magnetic coating made using a concave lip die shown in FIGS. 2 and 3 having a ⅝ inch length in accordance with Example 6.

The length of the concave lip is determinative of the duration the high shear is applied to the magnetic dispersion after the application point. Since the coating speed is held at a constant at 100 ft/min, the shear rate is equal, and only the length or duration of high shear changes in proportion to the arcuate length of the concave lip. FIGS. 28 and 29 illustrate the coatings made using a concave lip of 1 inch and ⅝ inch, respectively.

The above data suggests that the concave lip die with the longer arcuate length delivers smoother coatings by comparison with the concave lip die with the shorter arcuate length. The above data further suggests that shear applied for a longer time by means of a longer concave lip improves the surface characteristics and, therefore, the electrical performance of the magnetic recording media.

It will be apparent to those skilled in the art that various modifications and variations can be made in the coating apparatus of the present invention and in construction of this coating apparatus without departing from the scope or spirit of the invention. For example, instead of the backing roller and a concave lip, a flat backing plate and a flat lip may be used at a uniform distance defining an extended high shear region.

Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. A coating apparatus for coating a liquid dispersion of magnetic particulate media onto a continuously moving substrate comprising:
   a die unit having two die sections opposedly fastened together and defining a narrow planar gap, a coat hanger-shaped distribution chamber, a healing chamber, and a dispersion outlet;
   a backing roller rotatably mounted adjacent said dispersion outlet for supporting a continuously moving substrate; and
   a concave lip extending arcuately from said dispersion outlet along one die section in close conformity with and at a substantially uniform distance from said backing roller, wherein said backing roller and said concave lip define a narrow radial gap having a width less than about 0.01 inches, said concave lip having a surface finish less than about 20 microinches.

2. A coating apparatus as claimed in claim 1, wherein the width of said narrow planar gap is less than about 0.01 inches.

3. A coating apparatus as claimed in claim 1, wherein the arcuate length of said concave lip is between about 0.75 to 2 inches.

4. A coating apparatus as claimed in claim 1, wherein the width of said narrow radial gap is between about 1.0 to 2.0 mils.

5. A coating apparatus comprising:
   a die unit having two die sections opposedly fastened together and defining a narrow planar gap, a coat hanger-shaped distribution chamber, a cylindrical cavity having a rotating bar rotatably mounted therein, and a dispersion outlet;
   a backing roller rotatably mounted adjacent said dispersion outlet for supporting a continuously moving substrate, and
   a concave lip extending arcuately from said dispersion outlet along one die section in close conformity with and at a substantially uniform distance from said backing roller, wherein said backing roller and said concave lip define a narrow radial gap having a width less than about 0.01 inches, said concave lip having a surface finish less than about 20 microinches.

6. A coating apparatus as claimed in claim 5, wherein the width of said narrow planar gap is less than about 0.01 inches.

7. A coating apparatus as claimed in claim 5, wherein the arcuate length of said concave lip is between about 0.75 to 2 inches.

8. A coating apparatus as claimed in claim 5, wherein the width of said narrow radial gap is between about 1.0 to 2.0 mils.

* * * * *